United States Patent
Zhou et al.

(10) Patent No.: US 11,907,043 B2
(45) Date of Patent: Feb. 20, 2024

(54) ADAPTIVE WAKE-UP FOR POWER CONSERVATION IN A PROCESSOR

(71) Applicant: Apple Inc., Cupertino, CA (US)

(72) Inventors: Ping Zhou, San Diego, CA (US); Nikolai Schlegel, Danville, CA (US); Navid Ehsan, San Diego, CA (US); Zhimin Chen, San Jose, CA (US); Gerard D. Jennings, Bavaria (DE)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 17/664,999

(22) Filed: May 25, 2022

(65) Prior Publication Data

US 2023/0384856 A1    Nov. 30, 2023

(51) Int. Cl.
*G06F 1/3296* (2019.01)
*G06F 13/16* (2006.01)

(52) U.S. Cl.
CPC ........ *G06F 1/3296* (2013.01); *G06F 13/1668* (2013.01)

(58) Field of Classification Search
CPC ........................... G06F 1/3296; G06F 13/1668
See application file for complete search history.

(56) References Cited

U.S. PATENT DOCUMENTS

| | | | |
|---|---|---|---|
| 7,369,815 B2 | 5/2008 | Kang et al. | |
| 7,739,528 B2 | 6/2010 | Zhuang et al. | |
| 9,020,459 B2 | 4/2015 | Waters et al. | |
| 9,301,252 B2 | 3/2016 | Narasimha et al. | |
| 10,509,576 B2 | 12/2019 | Sodhi et al. | |
| 2007/0234076 A1 | 10/2007 | Yang | |
| 2008/0307244 A1 | 12/2008 | Bertelsen et al. | |
| 2009/0293072 A1 | 11/2009 | Elshocht et al. | |
| 2013/0017854 A1* | 1/2013 | Khawer | H04W 52/0206 455/522 |
| 2014/0119256 A1 | 5/2014 | Kim | |
| 2016/0323821 A1 | 11/2016 | Zhang | |
| 2016/0381191 A1* | 12/2016 | Marque | G06F 15/163 709/226 |
| 2017/0265132 A1* | 9/2017 | Elsayed | H04W 52/028 |

FOREIGN PATENT DOCUMENTS

CN    102823143 B    7/2015

* cited by examiner

*Primary Examiner* — Terrell S Johnson
(74) *Attorney, Agent, or Firm* — Kilpatrick Townsend & Stockton LLP

(57) ABSTRACT

A processor can include various processing pipelines that perform different data processing operations, with different pipelines having dedicated logic and memory circuits. A power management circuit can determine when to supply power to various pipelines, including the logic and memory circuits of the various pipelines, depending on a current operating mode of the processor. When a memory circuit transitions to a lower power state such as a sleep state, data can be saved to a different memory circuit that is not transitioning to a lower power state, and when the memory circuit is powered up again, the data can be restored from the different memory circuit.

20 Claims, 8 Drawing Sheets

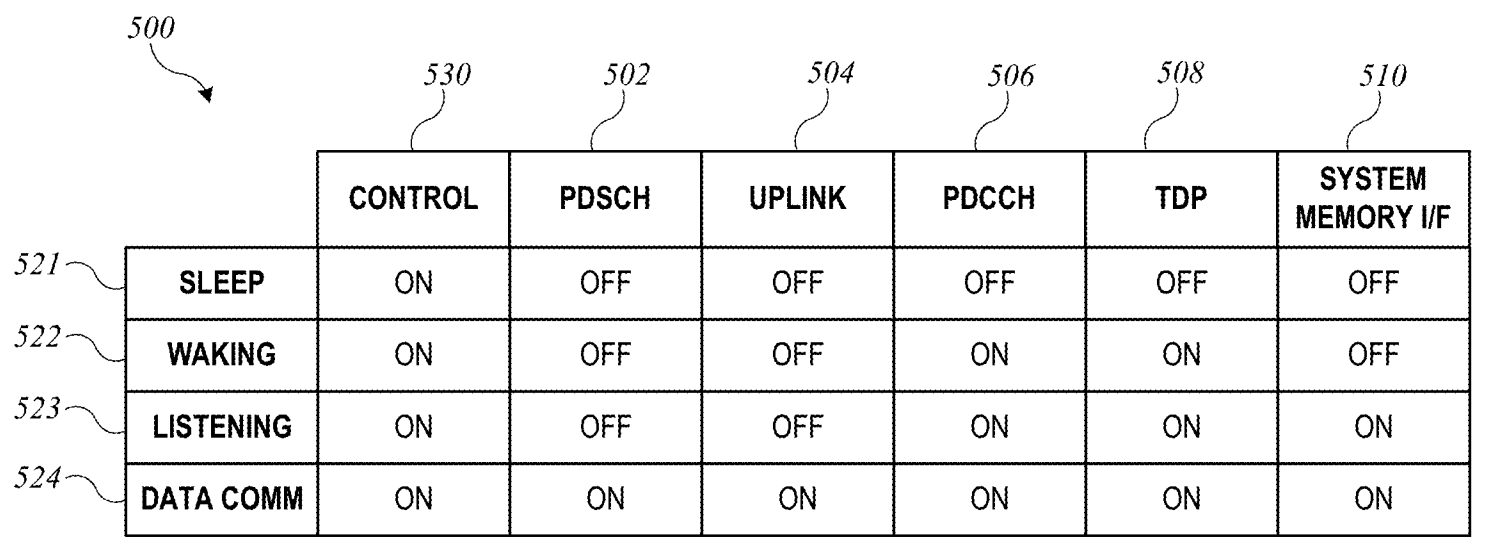

| | CONTROL | PDSCH | UPLINK | PDCCH | TDP | SYSTEM MEMORY I/F |
|---|---|---|---|---|---|---|
| SLEEP | ON | OFF | OFF | OFF | OFF | OFF |
| WAKING | ON | OFF | OFF | ON | ON | OFF |
| LISTENING | ON | OFF | OFF | ON | ON | ON |
| DATA COMM | ON | ON | ON | ON | ON | ON |

FIG. 5

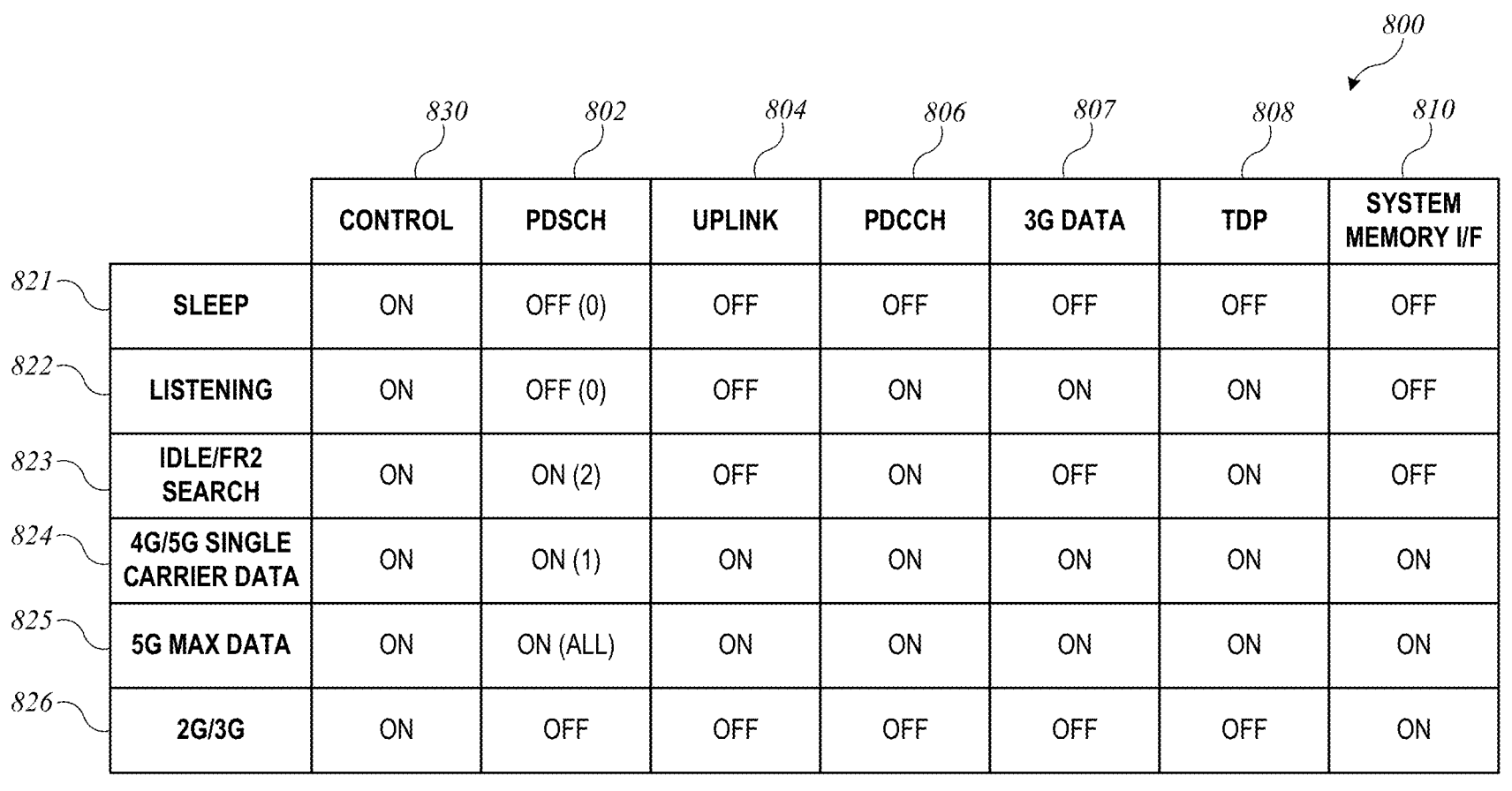

| | CONTROL | PDSCH | UPLINK | PDCCH | 3G DATA | TDP | SYSTEM MEMORY I/F |
|---|---|---|---|---|---|---|---|
| SLEEP | ON | OFF (0) | OFF | OFF | OFF | OFF | OFF |
| LISTENING | ON | OFF (0) | OFF | ON | ON | ON | OFF |
| IDLE/FR2 SEARCH | ON | ON (2) | OFF | ON | OFF | ON | OFF |
| 4G/5G SINGLE CARRIER DATA | ON | ON (1) | ON | ON | ON | ON | ON |
| 5G MAX DATA | ON | ON (ALL) | ON | ON | ON | ON | ON |
| 2G/3G | ON | OFF | OFF | OFF | OFF | OFF | ON |

FIG. 8

ADAPTIVE WAKE-UP FOR POWER CONSERVATION IN A PROCESSOR

BACKGROUND

The present disclosure relates generally to data processing and, in particular, to adaptive wake-up for power conservation in a processor such as a cellular modem processor.

With the advent of high-speed cellular data communication, users of mobile devices are increasingly able to access information when and where they need it. Cellular data communication standards, promulgated by the 3rd Generation Partnership Project (3GPP), enable radio-frequency communication between a base station (typically implemented at a cellular antenna tower) and various user equipment (UE), which can be a mobile device such as a smart phone, tablet, wearable device, or the like, via an "uplink" from the UE to the base station and a "downlink" from the base station to the UE.

Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels.

The specifications also define the sequence of operations used to prepare data for transmission as a radio-frequency (RF) signal on each channel. By way of example of the complexity involved, the general sequence of operations for PDSCH involves the following steps: The base station receives a transport block consisting of a sequence of data bits to be communicated to the UE. The base station adds cyclic redundancy check (CRC) bits, segments the transport block based on a maximum codeword size, adds CRC bits per-segment, encodes each segment using an encoding algorithm that adds parity bits to enable error correction, performs bit interleaving and rate matching operations that improve robustness against channel loss, and applies a scrambling algorithm. The resulting bit sequence is then mapped onto a sequence of modulation symbols that are assigned to subcarrier frequencies and time bins (typically referred to as "resource elements"). An inverse Fast Fourier Transform (IFFT) generates a digital representation of a waveform that can be converted to analog, mixed with a carrier frequency, and transmitted via an antenna (or antennal array) to the UE. The UE reverses the base-station operations to recover the data. For instance, the UE can receive the RF signal, extract a baseband signal by removing the carrier frequency, generate a digitized representation of the baseband signal, and apply a Fast Fourier Transform (FFT) to transform the signal to frequency domain. A demapper can apply a channel estimate to produce a sequence of log likelihood ratios (LLRs) representing the relative probability of each transmitted bit being either 0 or 1. The LLR sequence can be descrambled, de-interleaved and de-rate-matched, decoded, and error-corrected (based on parity and CRC bits after decoding), thereby producing output data blocks. For PUSCH, the sequence of operations is similar, with the roles of base station and UE reversed. PUCCH and PDCCH, which generally include smaller blocks of data, have their own associated sequences of operation. The particular operations and sequences may vary; for instance the shared channels for 4G and 5G use different encoding algorithms and a different order of interleaving and rate matching operations.

To manage these operations at high data rates, the UE typically includes a dedicated cellular modem. A cellular modem can be implemented as one or more integrated circuits, logically separated into a "baseband" processor and a "radio-frequency," or "RF," processor. The baseband processor handles operations such as segmentation, encoding, interleaving and rate matching, and scrambling for the uplink channels (and the reverse operations for the downlink channels), while the RF processor handles waveform generation and all analog operations.

Many types of UE are portable, battery-powered devices such as smart phones, tablets, wearable devices, and the like. For such devices, it is desirable to have a cellular modem that is area-efficient and power-efficient while supporting high data rates. In addition, to support mobility across a range of geographic areas where base stations supporting different standards may be available, it is also desirable that the same modem can support multiple cellular data communication specifications, e.g., both 4G and 5G.

SUMMARY

Certain embodiments disclosed herein relate to power management techniques for a processor such as a cellular modem processor. In some embodiments, the processor can include various processing pipelines that perform different data processing operations. For example, a first pipeline can have a first memory circuit and a first logic circuit configured to process a physical downlink control channel; a second pipeline can a second memory circuit and a second logic circuit configured to process a downlink data channel; and a third pipeline can have a third memory circuit and a third logic circuit configured to process one or more uplink data channels. The processor can also include a power management circuit configured to determine when to supply power to the first, second, and third memory circuits and the first, second, and third logic circuits. In some embodiments, the power management circuit can be configured to periodically power up the first memory circuit and the first logic circuit to enable a listening operation (e.g., listening for paging signals from a base station indicating that the base station has data to send to the processor); power up the second and third memory circuits and the second and third logic circuits when data communication is requested; and transition the second and third memory circuits and the second and third logic circuits to a lower power state in response to determining that data communication has ended. In some embodiments, when a memory circuit is transitioned to the lower power state (also referred to herein as being "powered down"), data can be saved to a different memory circuit that is not being powered down, and when the memory circuit is powered up again, the data can be restored from the different memory circuit.

The following detailed description, together with the accompanying drawings, will provide a better understanding of the nature and advantages of the claimed subject matter.

BRIEF DESCRIPTION OF THE DRAWINGS

FIG. 5 shows a table illustrating power states that can be assigned to various portions of the memory and logic circuitry in a cellular modem processor according to some embodiments.

FIG. 8 shows a table illustrating power states that can be assigned to various portions of the memory and logic circuitry in a cellular modem processor according to some embodiments.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
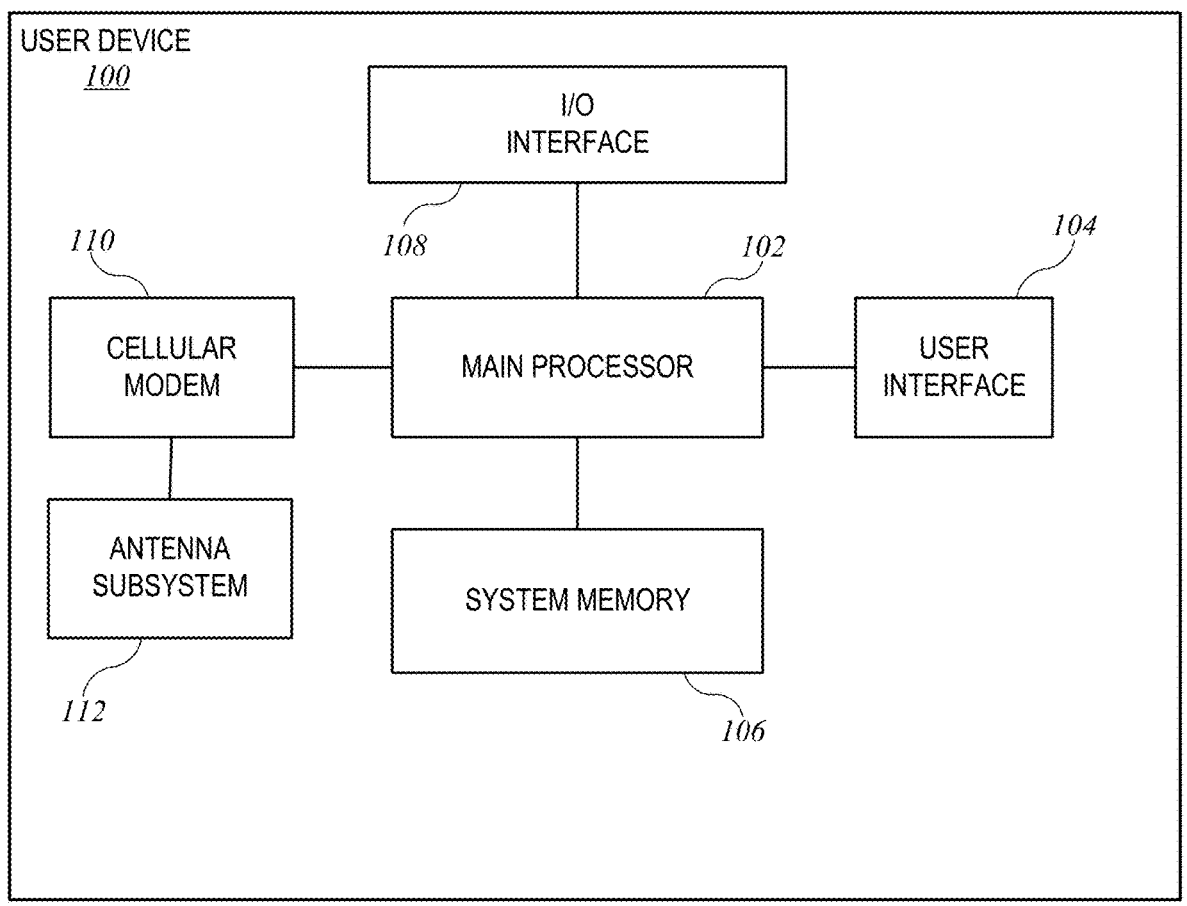
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 (which can be an application processor) can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user interface 104 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. Example implementations of cellular modem 110 are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
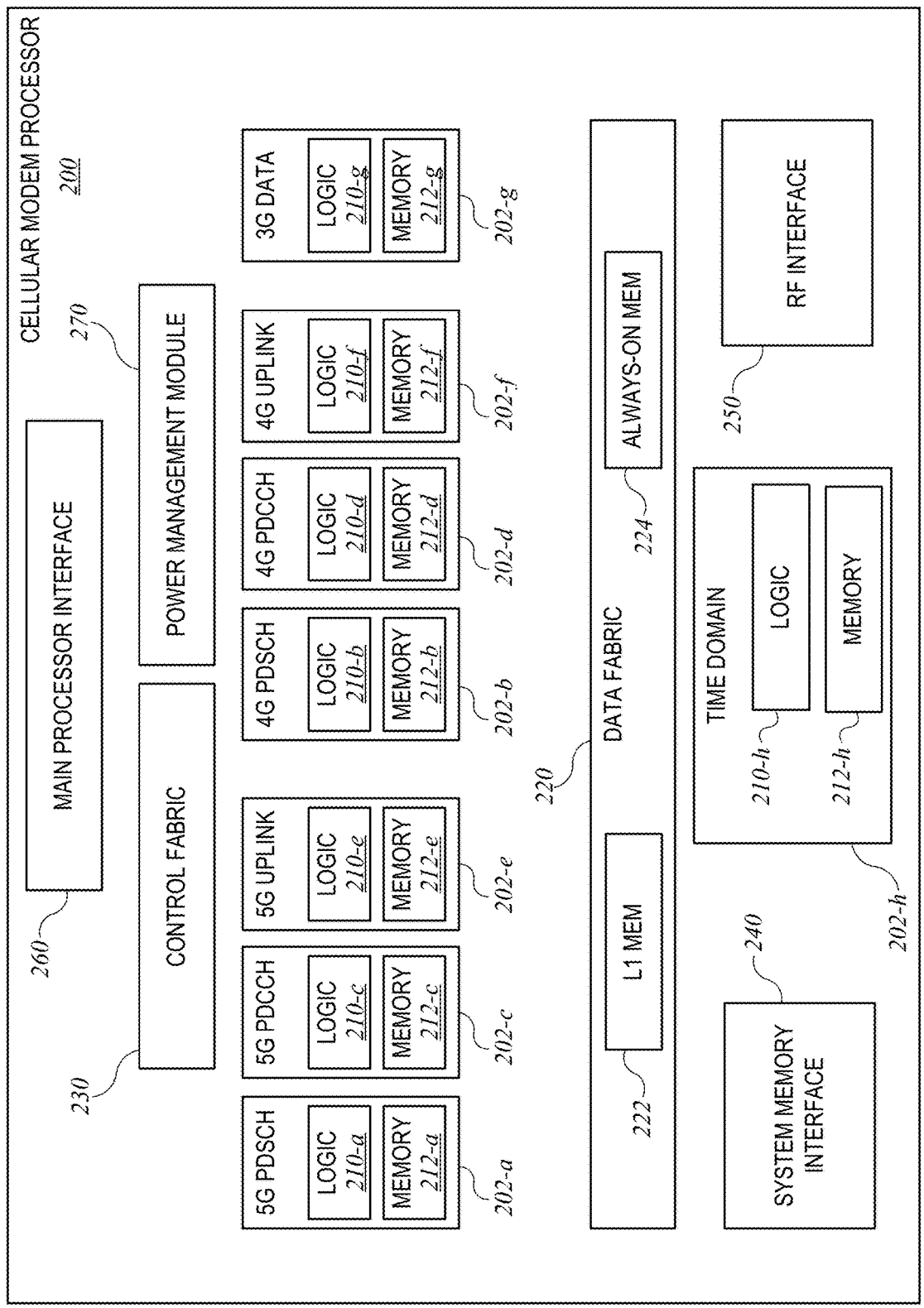
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Signal processing capabilities of cellular modem processor 200 can be implemented in various processing pipelines 202, examples of which are shown as pipelines 202-a through 202-h. Each pipeline 202 can include one or more dedicated logic circuits 210 that implement a particular sequence of operations associated with cellular data communication. The operations can conform to the specifications of a particular cellular data network, including 4G and/or 5G networks. For example, 5G PDSCH pipeline 202-a and 4G PDSCH pipeline 202-b can implement processing pipelines for physical downlink shared channel (PDSCH) processing for and 4G networks. 5G PDCCH pipeline 202-c and 4G PDCCH pipeline 202-d can implement processing pipelines for physical downlink control channel (PDCCH) processing for 5G and 4G networks. Downlink control information extracted from the control channel can be provided to other pipelines or components of cellular modem processor 200, e.g., via a data fabric 220 that supports data transfer between components of cellular modem processor 200. 5G uplink pipeline 202-e and 4G uplink pipeline 202-f can implement processing pipelines for physical uplink control channel (PUCCH) processing and physical uplink shared channel (PUSCH) processing for 5G and 4G networks. In some embodiments, one or more reconfigurable pipelines can be provided that are capable of supporting both 4G and 5G networks using the same circuitry. Pipelines 202-a through 202-f can operate in the frequency domain. Time domain pipeline 202-h can implement conversions between time domain and frequency domain, which can include Fourier transforms and inverse Fourier transforms (e.g., using Fast Fourier Transform (FFT) or other discrete Fourier transform (DFT) algorithms). In some embodiments, one or more separate pipelines 202-g can be provided to support "3G" data uplink and downlink, e.g., implementing various standards and protocols such as Global Systems for Mobile (GSM), Universal Mobile Telecommunication Services (UMTS), CDMA2000, and/or other standards and protocols. The particular implementation of various pipelines, and the number of pipelines can be varied as desired.

Each pipeline 202 can also include dedicated memory circuits 212 coupled to logic circuits 210. Memory circuits 212 can include buffer memories that store data at various stages of processing within the pipeline. Memory circuits 212 can also include control and status registers or other memory circuits that store configurable parameters for the pipeline, memory circuits that store program code executed by the pipeline, and/or other memory circuits. Any type or combination of memory circuits can be used. The present disclosure assumes that memory circuits 212 include volatile memory circuits that retain data only as long as power is supplied to the memory circuit.

As these examples illustrate, each pipeline 202 can implement complex operations, and different pipelines 202 can implement disparate operations. In some instances, cellular modem processor 200 can include multiple copies of the same pipeline 202, which can operate in parallel on different portions of a data stream to support higher throughput. Additionally or instead, a pipeline 202 can be reconfigurable to support different operations. For instance, in some embodiments, cellular modem processor 200 can have one pipeline 202-a dedicated to 5G PDSCH processing and two copies of a different pipeline 202-b that can be reconfigured for 4G or 5G PDSCH processing. Any number and combination of data processing pipelines can be provided.

To facilitate sharing of data between different pipelines 202, a data fabric 220 including a memory 222 local to cellular modem processor (referred to as "L1 memory") can be provided. Data fabric 220 can include memory circuits (e.g., SRAM, DRAM, or the like) implementing L1 memory 222, a read interface and a write interface connected via crossbars to clusters 202, and arbitration logic to manage multiple requests (e.g., using time division multiplexing or other techniques). In some embodiments, data fabric 220 can be implemented such that any cluster 202 can access any location in L1 memory 222. A particular memory or data fabric architecture is not critical to understanding the present disclosure, and a variety of architectures, including conventional architectures, can be used. In some embodiments, L1 memory 222 can be used to transfer data into and out of pipelines 202. Data fabric 220 can also include a region of "always-on" memory 224, which can include volatile memory circuits. In some embodiments, always-on memory 224 is configured such that its memory circuits receive sufficient power to retain data stored therein for as long as cellular modem processor 200 remains powered on, including during any sleep states that cellular modem processor 200 may enter. (Examples of sleep states are described below.) In some embodiments, a portion or all of L1 memory 222 can be included in the always-on memory 224.

Control fabric 230 can include circuitry implementing communication between processing pipelines 202 and/or between cellular modem processor 200 and other components of a device or system (e.g., user device 100 of FIG. 1) in which cellular modem processor 200 operates. For example, control fabric 230 can support messages from uplink pipelines 202-e, 202-f to time domain pipeline 202-h indicating when uplink data is ready for conversion to time domain and transmission, messages from time domain pipeline 202-h to downlink pipelines 202-a through 202-d indicating when downlink data has been received and is ready for decoding. Any other messages or control signals to coordinate operations across different pipelines 202 or other components of cellular modem processor 200 can be supported via control fabric 230. A particular control architecture is not critical to understanding the present disclosure, and a variety of architectures, including conventional architectures, can be used.

Cellular modem processor 200 can also include interfaces to other components of a system (e.g., user device 100 of FIG. 1) within which cellular modem processor 200 operates. For instance, a system memory interface 240 can provide a direct memory access (DMA) interface to transfer data between L1 memory 222 and system memory 106 of FIG. 1, including data for transmission via PUSCH and data received via PDSCH. RF interface 250 can transfer data to and from antenna subsystem 112 (e.g., as a digital data stream that is converted to or from an analog waveform by antenna subsystem 112). Main processor interface 260 can communicate with main processor 102, via an interface such as Advanced eXtensible Interface (AXI), which is part of ARM Advanced Microcontroller Bus Architecture or any other suitable interface for communication between a main processor and a coprocessor. System memory interface 240, RF interface 250, and main processor interface 260 can be coupled via control fabric 230 to other elements within cellular modem processor 200.

In some embodiments, cellular modem processor 200 can also include a power management module 270. Power management module 270 can include programmable and/or fixed-function logic circuitry that implements power management for cellular modem processor 200. Power management module 270 can be configured to determine a current operating mode of cellular modem processor 200 (e.g., whether cellular modem processor 200 is acquiring signal, idle, paging, transmitting and/or receiving data, etc.). Based on the operating mode, power management module 270 can selectively power down unused components of cellular modem processor 200, including logic circuits 210 and memory 212 in pipelines 202 that are not currently in use, and can selectively power up various components of cellular modem processor 200 in response to various occurrences or events indicating that particular components may be needed. Selective power delivery can be implemented using switches (e.g., transistors) or other circuit components operated under control of decision logic in power management module 270. Specific examples of such decision logic are described below.

It will be appreciated that cellular modem processor 200 is illustrative and that variations and modifications are possible. A cellular modem processor can include any number and combination of pipelines, supporting any number and combination of cellular data communication standards. Data and control fabrics can be varied as desired. In some embodiments, cellular modem processor 200 can provide a high throughput to support high-speed cellular networks (e.g., 12 Gbps for a 5G network).

In some embodiments, cellular modem processor 200 may be used in a mobile device (e.g., a smart phone or tablet) that is powered by a battery. In such environments, reducing power consumption can help to provide longer battery life, which is generally desirable. For instance, power consumption by cellular modem processor 200 can be reduced by powering down portions of the processor that are not used in a given operating mode.

Figure 3:
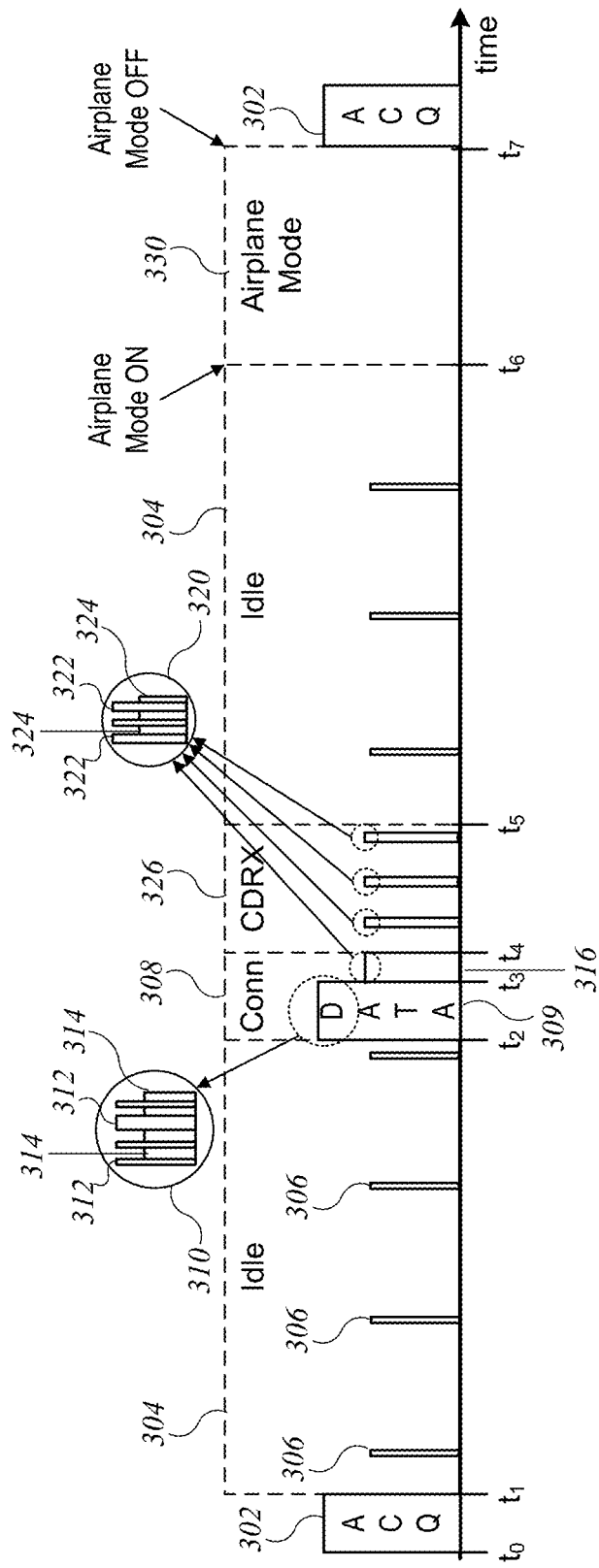
FIG. 3 shows a timeline illustrating various use-cases for a cellular modem processor in a mobile device such as a smart phone according to some embodiments.

FIG. 3 shows a timeline illustrating various use-cases for a cellular modem processor 200 in a mobile device such as a smart phone according to some embodiments. At time to, the device is powered on, and cellular modem processor 200 enters a carrier-acquisition (ACQ) mode 302. In ACQ mode 302, cellular modem processor 200 locates and identifies itself to a base station of a cellular network with which it is authorized to communicate. Standard carrier-acquisition protocols can be used. After carrier acquisition, cellular modem processor 200 can enter an idle mode 304 at time $t_1$. Operation in idle mode 304 can include listening periods 306 that occur at regular time intervals (referred to as "paging intervals"), during which cellular modem processor 200 listens for paging signals from the base station indicating that the base station has data to send to the user device. For example, in 4G and 5G networks, cellular modem processor 200 may listen for downlink control information on PDCCH (e.g., using pipelines 202-c and/or 202-d), and the downlink control information can indicate whether the base station has data to send. Other protocols can also be used depending on the particular network(s) supported by cellular modem processor 200.

From idle mode 304, cellular modem processor 200 can enter connected mode 308 at a time $t_2$. In some instances, a transition from idle mode 304 to connected mode 308 can occur in response to a paging signal indicating that the base station has data to send. A transition from idle mode 304 to connected mode 308 can also occur in response to a signal (e.g., an interrupt signal received via main processor interface 260) indicating that the user device has data to transmit to the base station. In connected mode 308, data communication 309 can occur. For instance, cellular modem processor 200 can send and/or receive data by operating appropriate uplink pipeline(s) 202-e, 202-f and/or downlink pipeline(s) 202-a, 202-b. Inset 310 shows that data communication 309 can occur in bursts 312 during which data is sent and/or received, with idle periods 314 (which may be short) between bursts.

As shown at time $t_3$, at the end of data communication a waiting period 316 may occur. During waiting period 316, cellular modem processor 200 can actively listen at relatively frequent intervals, as shown in inset 320, where active listening periods 322 alternate with idle periods 324. (Idle periods 324 can be shorter than the time between listening periods 306 in idle mode 304.) If waiting period 316 continues for a sufficient time without new data to send or receive, then cellular modem processor 200 can enter a connected discontinuous receive (CDRX) mode 326 at time $t_4$. In CDRX mode 326, the idle period 324 between active listening periods 322 may be increased until, at time $t_5$, cellular modem processor 200 re-enters idle mode 304.

In some embodiments, user device 100 can also support an "airplane" mode in which cellular modem processor 200 is inactive while other functions of user device 100 remain available to the user. In the timeline of FIG. 3, the user activates airplane mode at time $t_6$, and cellular modem processor 200 enters airplane mode 330. While in airplane mode, cellular modem processor 200 can be placed into a minimum-power configuration (or completely powered off). At time $t_7$, the user deactivates airplane mode. In response, cellular modem processor 200 can power up and enter acquisition mode 302.

It should be understood that FIG. 3 is intended to illustrate different operating modes and behaviors of cellular modem processor 200 and not to limit the operation of cellular modem processor 200 to any particular sequence of modes or duration of any mode. Cellular modem processor 200 can transition among the modes in different sequences and can remain in a given mode for any length of time, depending on how the user device is being used.

As FIG. 3 illustrates, cellular modem processor 200 can spend the majority of time in idle mode 304. Further, even in actives modes such as connected mode 308 or CDRX mode 326, there may be idle periods (e.g., periods 314). Accordingly, even a small reduction in power consumption of cellular modem processor 200 while idle can provide significant benefits for battery life.

According to some embodiments, reducing power consumption can include powering down unused logic circuits 210 and/or memory circuits 212 in cellular modem processor 200. To the extent that the memory circuits 212 are volatile memory circuits, powering down memory circuits 212 may result in loss of data stored therein. In some embodiments, data stored in a particular memory circuit 212 can be preserved by saving the data to another memory location such as always-on memory 224 (or to any nonvolatile memory circuit or to a volatile memory circuit that is not being powered down) prior to powering down the particular memory circuit 212, then restoring the data when the particular memory circuit 212 is powered back up. This save-and-restore operation consumes some power. Accordingly, there is a design tradeoff between keeping a memory circuit 212 powered up and using a save-and-restore operation to support powering down of the memory circuit 212.

Figure 4A:
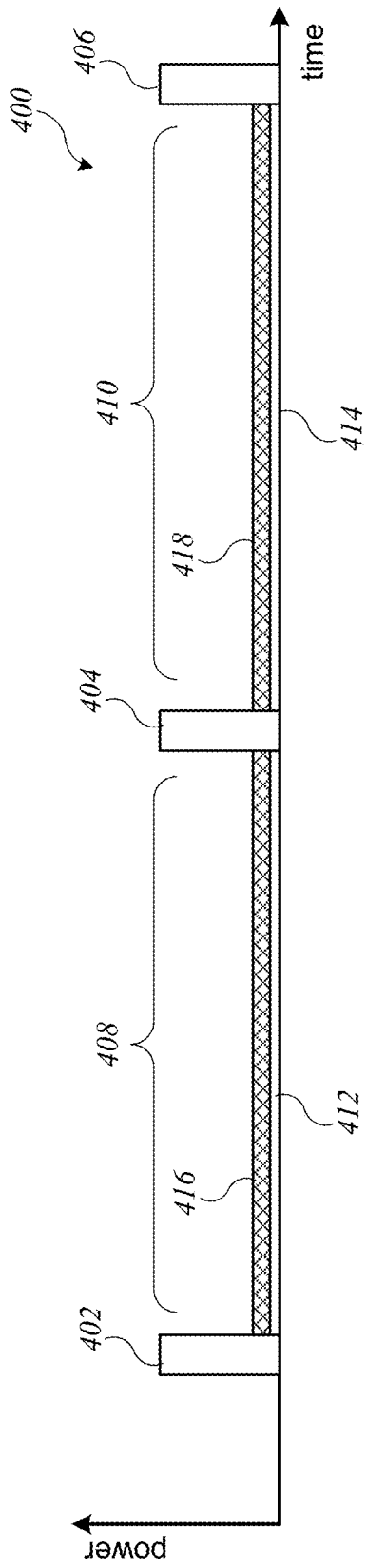
FIGS. 4A and 4B show timelines illustrating a design tradeoff that can be considered in some embodiments.
Figure 4B:
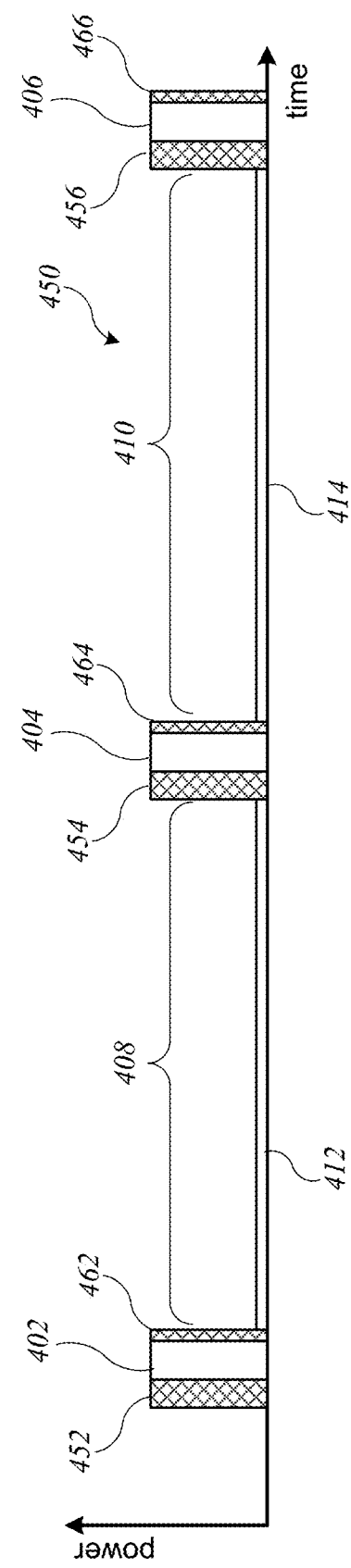

To illustrate the design tradeoffs, FIGS. 4A and 4B show timelines of power consumption for a volatile memory circuit 212 as a function of time. FIG. 4A shows a timeline 400 of power consumption in a scenario where data is retained in memory circuit 212 during idle periods. Active periods, where power consumption increases as data is read and/or written, are shown at 402, 404, and 406. During idle periods 408 and 410, leakage power loss may occur, as shown by white areas 412, 414. Shaded areas 416, 418 indicate power that is consumed to retain data in the volatile memory circuit 212, representing a "retention penalty." In general, the amount of energy represented by shaded areas 416, 418 depends on the size and type of the memory circuit 212 and the duration of idle periods 408, 410.

FIG. 4B shows a timeline 450 of power consumption in a scenario where volatile memory circuit 212 is powered off during idle periods 408, 410 between active periods 402, 404, 406. Prior to each active period 402, 404, 406, data is restored to the memory circuit 212. Restoring the data consumes power as indicated by shaded areas 452, 454, 456. At the end of each active period 402, 404, 406, data is saved to a backup memory (e.g., always-on memory 224). Saving the data consumes additional power as indicated by shaded areas 462, 464, 466. The "save-and-restore penalty" is thus represented by shaded areas 452, 454, 456 and 462, 464, 466. If, for a given usage pattern, the save-and-restore penalty is lower than the retention penalty, then powering down volatile memory circuits may be advantageous from the perspective of maximizing battery life. It should be understood that power consumption timelines 400 and 450 are not to any particular scale, and the power tradeoff depends on the particular architecture of a given pipeline or cellular modem processor as well as the amount of data to be saved and restored.

According to some embodiments, a state machine can be defined in which selected memory circuits 212 and logic circuits 210 in pipelines of a cellular modem processor can be selectively powered up or powered down. FIG. 5 shows a table 500 illustrating power states that can be assigned to various portions of the memory and logic circuitry in cellular modem processor 200 according to some embodiments. Columns of table 500 correspond to different components of cellular modem processor 200. "Control" column 530 indicates the state of control module 230 and power management module 270, which are always on in this example. PDSCH column 502 can correspond to 5G PDSCH pipeline 202-a, 4G PDSCH pipeline 202-b, or a reconfigurable pipeline that performs both 5G and 4G PDSCH decoding. Uplink column 504 can correspond to 5G uplink pipeline 202-e, 4G uplink pipeline 202-f, or a reconfigurable pipeline that performs both 5G and 4G uplink encoding for PUSCH and PUCCH. PDCCH column 506 can correspond to 5G PDCCH pipeline 202-c, 4G PDCCH pipeline 202-d, or a reconfigurable pipeline that performs both 5G and 4G PDCCH decoding. TDP column 508 can correspond to time domain pipeline 202-h. System memory interface column 510 can correspond to system memory interface 240.

Each row of table 500 corresponds to a different power state. "Sleep" state (row 521) can be a deep sleep state or other power state in which power consumption is low. In some embodiments, "Sleep" state (row 521) may be a power state in which a component is nearly completely powered down. As shown, control components can remain powered up ("ON") while other components (including logic and memory circuits for the processing pipelines) are powered down ("OFF"). In some embodiments, sleep state can be entered when in airplane mode 330 (as described above with reference to FIG. 3) and between listening periods 306 while in idle mode 304. "Waking" state (row 522) can be a transitional state between sleep state (row 521) and active states. For example, in the waking state, control module 230 can initialize security hardware and/or software elements that protect against loading of unauthorized data or instruction code into memories that may be about to power up. In some embodiments, the waking sate is also used to determine the next state transition; an example is described below. "Listening" state (row 523) can be an active state in which a PDCCH processing pipeline is powered up to actively listening for paging data from a base station while other processing pipelines (e.g., PDSCH and uplink pipelines) remain powered down. Listening state can be used, for example, during any of listening periods 306, 314, 324 described above with reference to FIG. 3. "Data communication" (or "data comm") state (row 524) can be an active state that is entered when cellular modem 200 is transmitting or receiving user data. In the data comm state, all components of cellular modem processor 200 can be powered up.

In some embodiments, powering up of pipelines for data and/or control channels may be specific to the current network protocol. For example, if cellular modem processor 200 has a dedicated pipeline 202-a for 5G PDSCH and a separate dedicated pipeline 202-b for 4G PDSCH, the pipeline corresponding to the network in use can be powered up in the data comm state while the pipeline not currently in use can remain powered down. In some embodiments, it may be desirable to power up both 4G and 5G user data pipelines during data communication, regardless of which network is currently active. For instance, 5G coverage may be unavailable in some areas, and if the user moves from an area where 5G is available into an area where only 4G is available, the network may switch from 5G to 4G. Conversely, if the user enters an area where 5G is available, the network may switch from 4G to 5G. In such cases, having all processing pipelines powered up may facilitate smoother transitions between different standards.

Figure 6:
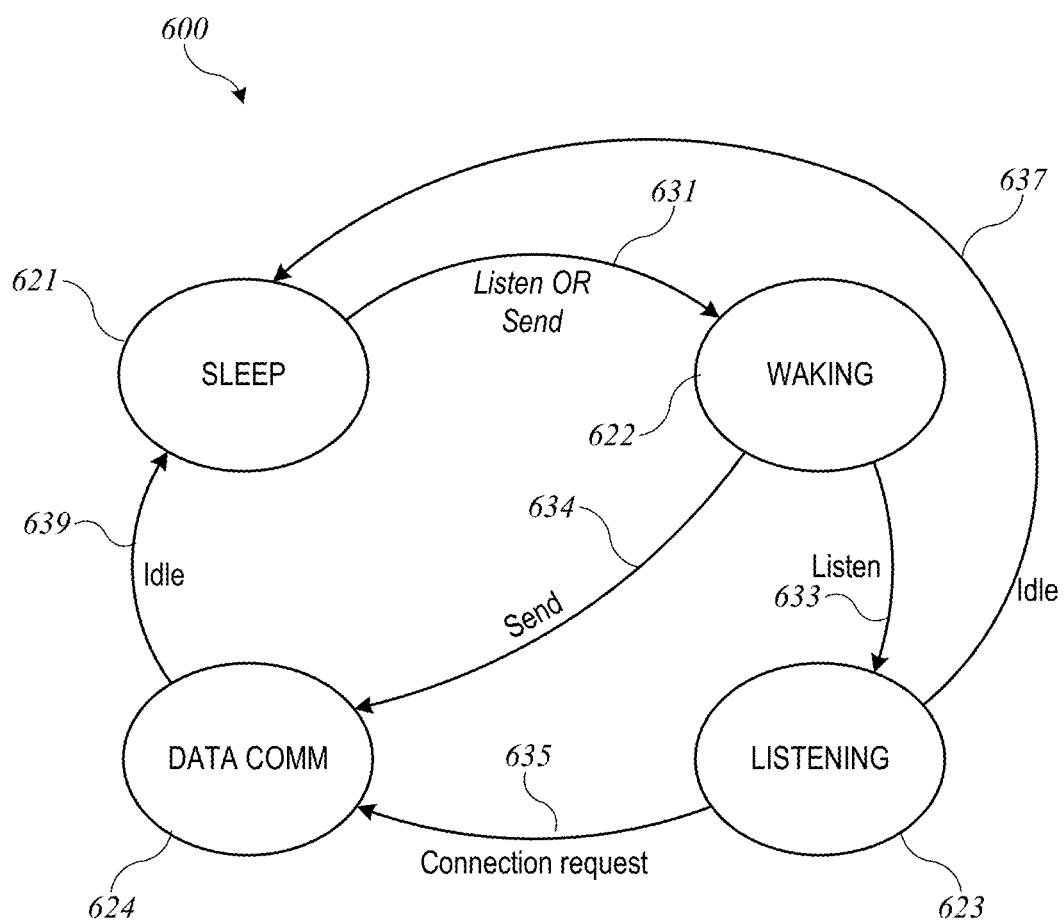
FIG. 6 shows a state machine diagram for the states shown in FIG. 5 according to some embodiments.

FIG. 6 shows a state machine diagram for the states shown in table 500 according to some embodiments. State machine 600 can support the operating modes shown in FIG. 3. For instance, power management module 270 can place cellular modem processor 200 into sleep state 621 when processor 200 is in idle mode 304 and paging operations 306 are not occurring. In sleep state 621, most or all components of cellular modem processor 200, including memory circuits associated with the various processing pipelines and L1 memory 222, can be in a powered-down state as shown in row 521 of table 500 of FIG. 5. Power can be delivered to components such as control module 230, power management module 270, main processor interface 260, and/or any other component that may be involved in determining when to exit sleep state 621.

A transition 631 to waking state 622 can be triggered by a timer that is set according to the paging interval, by an interrupt received via main processor interface 260 indicating that the user device has data to send, or by other techniques. In waking state 622, power management module 270 can identify the event that triggered transition 631 (e.g., paging timer or interrupt). In some embodiments, the transition to waking state 622 can include powering up a logic circuit in power management module 270 to identify the triggering event and determine which state transition to perform. For instance, depending on the triggering event, power management module 270 can execute a transition 633 to listening state 623 (e.g., if transition 631 occurred in response to the paging interval timer) or a transition 634 to data communication state 624 (e.g., if transition 631 occurred in response to an interrupt).

In listening state 623, a PDCCH pipeline (e.g., pipeline 202-c and/or pipeline 202-d) and a time domain pipeline (e.g., pipeline 202-*h*) can be powered up to receive and decode a signal containing downlink control information and to determine, based on the decoded downlink control information whether the base station has data to send to the user device. Components associated with processing received or transmitted user data (e.g., PDSCH pipelines 202-*a*, 202-*b* and/or uplink pipelines 202-*e*, 202-*f*) can remain powered down while the determination is made. If it is determined that the base station has data to send to the user device, power management module 270 can execute a transition 635 to data comm state 624. If the base station has no data to send, power management module 270 can execute a transition 637 back to sleep state 621, which can include powering down the PDCCH pipeline(s).

In data comm state 624, PDSCH, PDCCH and uplink pipelines can be powered up to send and receive data. In some embodiments, data comm state 624 can be a state in which all components of cellular modem processor 200 are powered up. Alternatively, depending on implementation, different pipelines can be selectively powered up or powered down based on the particular communication network. For instance, if 4G and 5G pipelines are implemented in separate circuits, the appropriate components can be selectively activated based on the standard in use. In some embodiments, e.g., where the user device is moving between areas of 4G and 5G coverage, it may be desirable to power up the pipelines for both 4G and 5G, which can facilitate network handoffs that may involve switching between standards.

As noted above with reference to FIG. 3, data communication can include periods of actively sending and receiving data alternating with idle periods. In some embodiments, power management circuit 270 can power down the logic circuits 210 of various pipelines 202 during the idle periods (e.g., using clock gating techniques) while keeping the memory circuits 212 powered up. In some embodiments, state machine 600 can remain in data comm state 624 until data communication ends, and a transition 639 to sleep state 621 can occur during or after the CDRX period following the end of data communication.

Figure 7:
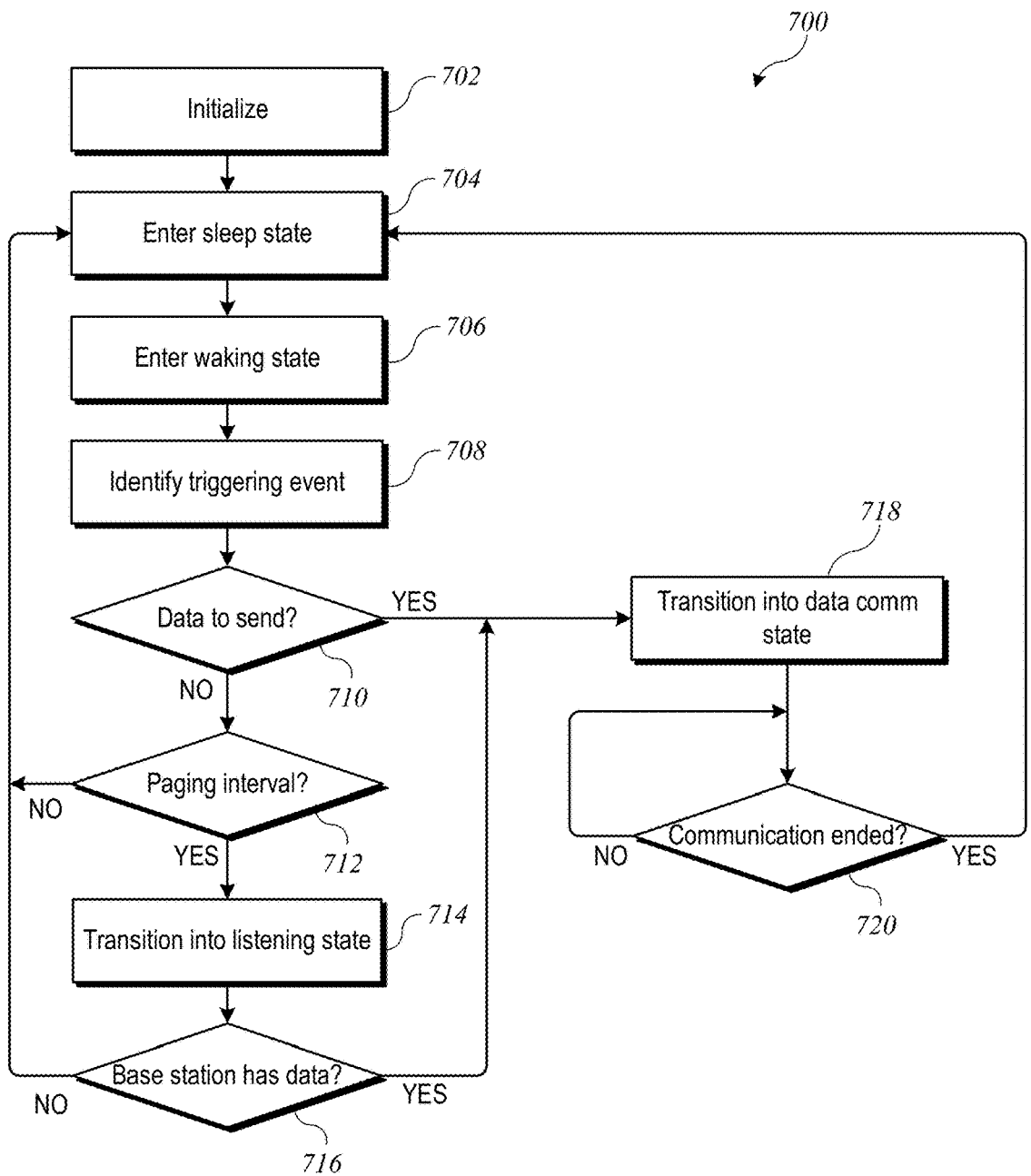
FIG. 7 shows a flow diagram of a power management process according to some embodiments.

In some embodiments, state machine 600 can be implemented in power management module 270 of cellular modem processor 200. FIG. 7 shows a flow diagram of a power management process 700 according to some embodiments. Process 700 can be implemented, e.g., in power management module 270 of cellular modem processor 200.

At block 702, initialization of power management module 270 can occur. Initialization of power management module 270 can be included in a power-up routine for cellular modem processor 200, which can be invoked when cellular modem processor 200 is powered on. As described above, powering on of cellular modem processor 200 can occur under various conditions, such as when the user device is powered on after being turned off or when the user device is switched out of airplane mode. Initialization of power management module 270 can include establishing the logic circuitry in a known state, loading firmware into memory local to power management module 270, and so on. During initialization, other activities such as self-tests and/or network acquisition can also be performed, and all components of cellular modem processor 200 may be powered up during initialization.

At block 704, after initialization, power management module 270 initiate a transition into sleep state 621. The transition can include powering down memory circuits that are not used in sleep state, as well as gating off clocks to logic circuits that are not used in sleep state.

At block 706, power management module 270 can enter waking state 622. Entry into waking state 622 can be triggered by various events, such as expiration of a paging interval timer or an interrupt from another processor (e.g., main processor 102) indicating that the user device has data to send. Entering waking state 622 can include initializing security hardware and/or software elements that protect against loading of unauthorized data or instruction code into memories that may be about to power up and/or powering up logic circuits in power management module 270 that are used to determine the next state transition.

At block 708, power management module can identify the triggering event that led to entering waking state 622. For instance, at block 710, power management module 270 can determine whether the user device has data to transmit. In some embodiments, the determination can be based on an interrupt signal received from main processor 102 of user device 100. (Interrupt processing can be asynchronous with other operations described herein.) At block 712, power management module 270 can determine whether the paging interval has elapsed. If there is no data to be transmitted or listening operation to be performed, power management module 270 can return to sleep state 621 (block 704), thereby reducing power consumption.

If, at block 712, the paging interval has elapsed, then, at block 714, power management module 270 can transition cellular modem processor 200 into listening state 622. In some embodiments, this transition can include powering up the memory and logic circuits of one or more PDCCH pipelines (e.g., pipeline 202-*c* and/or pipeline 202-*d*) and a time domain pipeline (e.g., pipeline 202-*h*). The PDCCH pipeline(s) can receive and process signals to extract downlink control information, which can include an indication of whether the base station has data to send to the user device. If, at block 716, the base station does not have data to send, then power management module 270 can return cellular modem processor 200 to sleep state 621 (block 704), which can include powering down the PDCCH pipeline(s) and/or any components that were powered up in the waking state.

If the base station has data to send or if the user device has data to send, then at block 718, power management module 270 can transition cellular modem processor 200 to data comm state 624. In some embodiments, this transition can include powering up memory and logic circuits of one or more PDSCH pipelines (e.g., pipeline 202-*a* and/or pipeline 202-*b*) and one or more uplink pipelines (e.g., pipeline 202-*e* and/or pipeline 202-*f*) to enable data transmission and reception. If the PDCCH pipeline(s) and time domain pipeline are not powered up, these pipelines can also be powered up when entering data comm state 624.

At block 720, power management module 270 can determine whether data communication has ended. For example, in accordance with 4G and 5G network protocols, if cellular modem processor 200 neither sends nor receives data for a given number of frames, cellular modem processor 200 can enter a CDRX operating mode as described above with reference to FIG. 3, in which the idle time between paging periods increases toward the paging interval associated with idle mode 304. In various embodiments, the end of data communication can be determined based on cellular modem processor 200 entering the CDRX operating mode or based on cellular modem processor 200 transitioning from CDRX to idle mode. When the end of data communication is detected, power management module 270 can transition cellular modem processor 200 to sleep state 621 (block 704), which can include powering down memory circuits and logic circuits of the PDSCH, PDCCH, and uplink pipelines.

Process 700 can continue as long as power is supplied to cellular modem processor 200.

Certain aspects of power management module 270 can be implemented using dedicated logic circuitry. For instance, the transition from sleep state 621 to waking state 622 can be implemented using a combination of a timer circuit that implements the paging interval and interrupt logic circuitry that responds to interrupt signals sent from the system processor. Other aspects of power management module 270 can be implemented using program code (e.g., firmware) executing in programmable logic circuits of cellular modem processor 200. For instance, the logic invoked while in waking state 622 to determine whether to transition to listening state 623 to data communication state 624 or back to sleep state 621 can be implemented using appropriate program code.

It should be understood that the states and state transitions shown in FIG. 6 and managed using process 700 of FIG. 7 can involve powering down or powering up memory circuits as well as logic circuits in various pipelines. Powering down and subsequent powering up of memory circuits can incorporate a save-and-restore operation as described above. For instance, any state transition in which a memory circuit is powered down can include saving data and/or executable program code from the memory circuit that is being powered down to a location in an always-on memory (e.g., memory 224) prior to switching off power to the memory circuit, and any state transition in which a memory circuit is powered up can include restoring data and/or executable program code from the location in always-on memory to the memory circuit that has been powered up. In some embodiments, saving and restoring of data and/or executable program code can be managed in accordance with hardware-based and/or firmware-based security protocols to protect against tampering. A variety of protocols can be used.

It should also be understood that save and restore operations need not be performed for every memory circuit in a particular pipeline. For example, a PDSCH pipeline may include one or more buffer memories that store received data at various interim stages of decoding. Once decoding is completed for a particular data block and the decoded data has been transferred elsewhere (e.g., to L1 memory), some or all of the data in the buffer memories can be discarded when the PDSCH pipeline is powered down.

In various embodiments, the particular power states can be defined as desired, and any number of power states can be provided. Different power states can correspond to different combinations of powered-up and powered-down components. By way of example, FIG. 8 shows a table 800 for a set of states according to some embodiments. In this example, it is assumed that cellular modem processor 200 supports 3G data communication as well as 4G and 5G data communication. It is also assumed that multiple parallel PDSCH pipelines are provided to support 4G and 5G data communication. Depending on data rate, all or fewer than all of the PDSCH pipelines may be used, and PDSCH pipelines that are not in use can be powered down during data communication. Separate hardware processing pipelines can be provided for 3G data communication.

Columns of table 800 correspond to different components of a cellular modem processor (e.g., cellular modem processor 200 of FIG. 2). "Control" column 830 indicates the state of control module 230, which is always on in this example. PDSCH column 802 corresponds to the PDSCH pipelines; the parenthetical for each state indicates the number of PDSCH pipelines that are powered up. Uplink column 804 can correspond to 5G uplink pipeline 202-*e*, 4G uplink pipeline 202-*f*, or a pipeline that performs both 5G and 4G uplink encoding for PUSCH and PUCCH. PDCCH column 806 can correspond to 5G PDCCH pipeline 202-*c*, 4G PDCCH pipeline 202-*d*, or a pipeline that performs both 5G and 4G PDCCH decoding. 3G column 807 can correspond to one or more pipelines dedicated to 3G data processing. TDP column 808 can correspond to time domain pipeline 202-*h*. System memory interface column 810 can correspond to system memory interface 240.

Each row of table 800 corresponds to a different power state. Sleep state (row 821) can be a deep sleep state in which power consumption is minimized. As shown, control module 230 and power management module 270 can remain powered up ("ON") while other components (including logic and memory) are powered down ("OFF"). In some embodiments, sleep state can be entered when in airplane mode 330 (as described above with reference to FIG. 3) and between listening periods 306 while in idle mode 304. 4G/5G listening state (row 822) can be an active state in which a PDCCH pipeline (indicated in column 806) is actively listening for paging data from a base station while other components remain powered off as shown in FIG. 8. listening state can be used, for example, during any of listening periods 306, 314, 324 described above with reference to FIG. 3. As in embodiments described above, while listening for paging data, user data is not being transferred, and PDSCH and uplink pipelines can remain powered off "4G idle/5G search" state (row 823) can be an active state in which cellular modem processor searches for a 5G network (e.g., in the "FR2," or millimeter-wave, frequency range defined in 5G standards). To support searching, PDCCH pipeline and one or more PDSCH pipelines (two PDSCH pipelines in the example shown) can be powered on and active while other components are powered down. "4G/5G single carrier data" state (row 824) can be an active state in which data communication is occurring but at a low enough rate that a subset of the PDSCH pipelines (one PDSCH pipeline in the example shown) is sufficient to decode the data. "5G data max" state (row 825) can be an active state in which data communication is occurring at a high rate and all PDSCH pipelines can be powered up. For a given data communication event, power management circuit 270 can select either the 4G/5G single carrier data state or the 5G data max state, depending on network conditions. "2G/3G" state (row 826) corresponds to 3G data communication. In this state, pipelines designed for 4G and/or 5G communication, such as the PDSCH pipelines, the uplink pipeline, and the PDCCH pipeline can be powered down while one or more dedicated 3G data pipelines are powered up. Appropriate state transitions between the states shown in rows 821-826 can be supported. Although a "waking" state is not shown in FIG. 8, it should be understood that a waking state can be provided, similarly to waking state 622 described above, to support a transition from sleep state 821 to any one of a number of other states, depending on the particular event that triggered the transition from sleep state 821 to the waking state.

As table 800 illustrates, any number and combination of power states can be defined, depending on the particular architecture of the cellular modem processor. Those skilled in the art with access to this disclosure will recognize that selection of power states for a given architecture is a matter of design choice, and that the optimal selection involves architecture-specific tradeoffs between power saving and the complexity of the power management logic. In addition, as noted above, whether powering down a memory circuit in a particular state results in net power savings (as compared to leaving the memory circuit powered on) depends on the amount of data to be saved and restored for a particular memory circuit and the length of time spent in the powered-down state. Circuit modeling techniques can be used to model power consumption in different scenarios and select an optimized set of states for a particular processor architecture.

In some embodiments, a particular pipeline can have multiple power-saving states. For instance, during data communication it may be desirable to reduce power to the logic circuits of a pipeline (e.g., by gating off a clock signal) during the idle intervals between active transmission or reception while keeping the memory circuits powered up.

While specific embodiments have been described, those skilled in the art will appreciate that variations and modifications are possible. For instance, a cellular modem processor can include any number and combination of pipelines and can support any number of radio access networks, including 4G and/or 5G. Further, techniques described herein are not limited to cellular modem processors and can be applied to other communication processors and other types of processors where transitioning logic and memory circuits to a low power state between periods of activity may be desirable. The number of states supported by the power management module can be chosen as desired, and each state can include providing power to a different combination of components of the cellular modem processor. Powering down volatile memory circuits can include saving some or all of the data stored therein to other memory circuits prior to powering down, and data can be saved to any other memory circuit that is not expected to be powered down. Powering up volatile memory circuits can include restoring data that was saved prior to power-down. As noted above, depending on how a particular volatile memory circuit is used, saving and restoring data may be optional; for instance, in the case of buffer memories within a pipeline, discarding data may be preferable to saving and restoring the data. In some embodiments, a power management module can power up or power down other components of a cellular modem processor, in addition to the pipelines. For example, RF interface 250, portions (or all) of L1 memory 222, and other components can be powered up or powered down in different power states. As used herein, "powering up" of a circuit refers to providing sufficient power to enable the circuit to operate; "powering down" refers to providing less power than needed for operation, which can be no power or a low level of power.

All processes described herein are illustrative and can be modified. Operations can be performed in a different order from that described, to the extent that logic permits; operations described above may be omitted or combined; and operations not expressly described above may be added.

Unless expressly indicated, the drawings are schematic in nature and not to scale. All numerical values presented herein are illustrative and not limiting. Reference to specific standards for cellular data communication (e.g., 4G LTE or 5G NR) are also for purposes of illustration; those skilled in the art with access to the present disclosure will be able to adapt the devices and methods described herein for compatibility with other standards.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

\*\*\*

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various embodiments may use computer program code to implement various features. Any such program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device, which can be any electronic device having the capability of reading and executing the program code, and/or external storage media readable by the electronic device that can execute the code. In some instances, program code can be supplied to the electronic device via Internet download or other transmission paths.

Numerous variations and modifications will become apparent to those skilled in the art once the above disclosure is fully appreciated. It is intended that the following claims be interpreted to embrace all such variations and modifications.

What is claimed is:

1. A processor comprising:
a plurality of processing pipelines associated with different tasks, the plurality of processing pipelines including:
a first pipeline having a first memory circuit and a first logic circuit configured to process a physical downlink control channel;
a second pipeline having a second memory circuit and a second logic circuit configured to process a downlink data channel; and
a third pipeline having a third memory circuit and a third logic circuit configured to process one or more uplink data channels; and
a power management circuit configured to determine when to supply power to the first, second, and third memory circuits and the first, second, and third logic circuits, wherein the power management circuit is configured to:
  periodically power up the first memory circuit and the first logic circuit to enable a listening operation to detect a data communication request;
  power up the second and third memory circuits and the second and third logic circuits when data communication is requested; and
  transition the second and third memory circuits and the second and third logic circuits to a lower power state in response to determining that data communication has ended.

2. The processor of claim 1 wherein the power management circuit is further configured such that the listening operation includes listening for a paging signal indicating that a base station has data to send to the processor.

3. The processor of claim 1 wherein the power management circuit is further configured to determine that data communication is requested based at least in part on an interrupt signal from a different processor indicating that the different processor has data ready to be transmitted.

4. The processor of claim 1 wherein the power management circuit is further configured such that determining that data communication has ended includes determining whether the processor has entered a connected discontinuous receive (CDRX) state or an idle state.

5. The processor of claim 1 wherein the plurality of processing pipelines includes a plurality of instances of the second pipeline having one or more instances of the second memory circuit and the second logic circuit and wherein the power management circuit is further configured to:
  determine a type of data communication requested; and
  power up the one or more instances of the second memory circuit and the second logic circuit based at least in part on the type of data communication.

6. The processor of claim 1 wherein the first, second, and third memory circuits are volatile memory circuits and wherein the power management circuit is further configured such that transitioning one or more of the first, second, or third memory circuits to the lower power state includes saving data from the first, second, or third memory circuit to a different memory circuit that is not transitioning to the lower power state.

7. The processor of claim 6 wherein the power management circuit is further configured such that powering up one or more of the first, second, or third memory circuits includes restoring data from the different memory circuit to the first, second, or third memory circuit.

8. An electronic device comprising:
  a first processor; and
  a second processor coupled to the first processor,
  wherein the second processor includes:
    a plurality of processing pipelines associated with different tasks, the plurality of processing pipelines including:
      a first pipeline having a first memory circuit and a first logic circuit configured to process a physical downlink control channel;
      a second pipeline having a second memory circuit and a second logic circuit configured to process a physical downlink shared channel; and
      a third pipeline having a third memory circuit and a third logic circuit configured to process one or more physical uplink channels; and
    a power management circuit configured to manage one or more power states, including:
      a sleep state in which the first, second, and third memory circuits and the first, second, and third logic circuits are in a low power state;
      a listening state in which the first memory circuit and the first logic circuit are powered up while the second and third memory circuits and the second and third logic circuits are in the low power state; and
      a data communication state in which the first, second, and third memory circuits and the first, second, and third logic circuits are powered up,
      wherein the power management circuit is further configured to:
        periodically transition from the sleep state to the listening state;
        while in the listening state, determine whether data communication should be enabled and transition from the listening state to the data communication state in response to determining that data communication should be enabled; and
        while in the data communication state, determine data communication has ended and transition from the data communication state to the sleep state in response to determining that data communication has ended.

9. The electronic device of claim 8 wherein the power management circuit is further configured to:
  receive an interrupt signal from the first processor while in either the sleep state or the listening state, the interrupt signal indicating that the electronic device has data ready to be sent; and
  transition to the data communication state in response to receiving the interrupt signal.

10. The electronic device of claim 8 wherein the plurality of processing pipelines includes a plurality of instances of the second pipeline and wherein the one or more power states include a plurality of data communication states including:
  a first data communication state in which all instances of the second pipeline are powered up; and
  a second data communication state in which at least one and fewer than all instances of the second pipeline are powered up,
  wherein the power management circuit is further configured to select one of the plurality of data communication states based on a type of data communication that should be enabled.

11. The electronic device of claim 10 wherein the second processor comprises a cellular modem processor configured to support data communication using a 4G radio area network and data communication using a 5G radio area network, and wherein the power management circuit is further configured to select the first data communication state for data communication using the 5G radio area network and to select the second data communication state for data communication using the 4G radio area network.

12. The electronic device of claim 8 wherein the first, second, and third memory circuits are volatile memory circuits and wherein the power management circuit is further configured such that powering down one or more of the first, second, or third memory circuits includes saving data from the first, second, or third memory circuit to a different memory circuit that is not being powered down.

13. The electronic device of claim 12 wherein the power management circuit is further configured such that powering up one or more of the first, second, or third memory circuits includes restoring data from the different memory circuit to the first, second, or third memory circuit.

14. A method implemented in a processor, the method comprising:
  placing the processor into a sleep state in which a plurality of processing pipelines are in a low power state, wherein the plurality of processing pipelines includes a first pipeline having a first memory circuit and a first logic circuit configured to process a physical downlink control channel, a second pipeline having a second memory circuit and a second logic circuit configured to process a physical downlink shared channel, and a third pipeline having a third memory circuit and a third logic circuit configured to process one or more physical uplink channels;
  determining when a paging interval has elapsed;
  in response to determining that the paging interval has elapsed:
    entering a listening state, wherein entering the listening state includes powering up the first pipeline including the first memory circuit and the first logic circuit; and
    determining, based at least in part on downlink control information received using the first pipeline, whether a base station has data ready to send to the processor;
  in response to determining that the base station has data ready to send, entering a data communication state, wherein entering the data communication state includes powering up the second and third memory circuits and the second and third logic circuits;
  determining that the data communication state should be exited; and
  in response to determining that the data communication state should be exited, returning to the sleep state, wherein returning to the sleep state includes powering down the first, second, and third memory circuits and the first, second, and third logic circuits.

15. The method of claim 14 further comprising:
  in response to determining that the data communication state should be ended, powering down the first memory circuit and the first logic circuit.

16. The method of claim 14 wherein disabling power to the second and third memory circuits includes saving data from the second or third memory circuit to a different memory circuit.

17. The method of claim 16 wherein enabling power to the second and third memory circuits includes restoring data from the different memory circuit to the second or third memory circuit.

18. The method of claim 14 further comprising:
  while in the sleep state, receiving an interrupt signal from another processor indicating that the other processor has data ready to transmit; and
  in response to the interrupt signal, entering the data communication state, wherein entering the data communication state further includes enabling power to the first memory circuit and the first logic circuit.

19. The method of claim 18 wherein the other processor is an application processor of an electronic device.

20. The method of claim 14 further comprising:
  while in the listening state, receiving an interrupt signal from another processor indicating that the other processor has data ready to transmit; and
  in response to the interrupt signal, entering the data communication state regardless of whether the base station has data ready to send.

* * * * *